May 25, 1971
C. L. LARSON
3,580,778
METHOD AND APPARATUS FOR PLYWOOD PANEL LAY-UP
Filed June 27, 1968
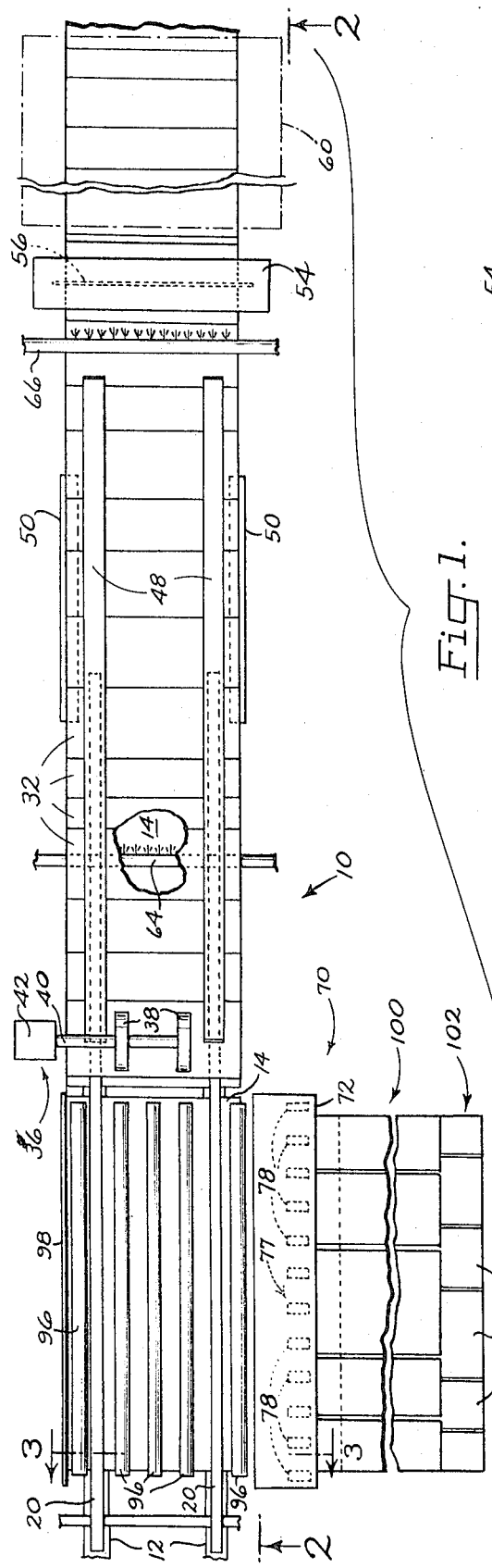
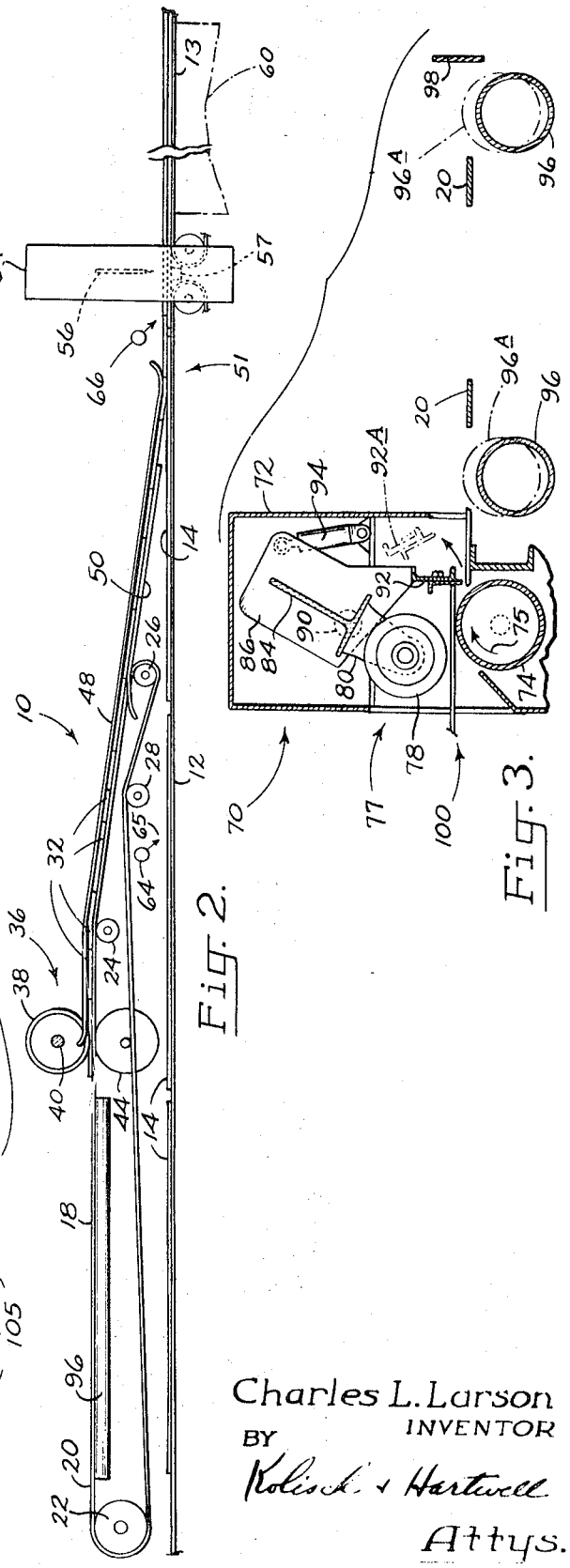
Charles L. Larson
INVENTOR
BY
Kolisch & Hartwell
Attys.

United States Patent Office 3,580,778
Patented May 25, 1971

---

3,580,778
METHOD AND APPARATUS FOR PLYWOOD PANEL LAY-UP
Charles L. Larson, Grants Pass, Oreg., assignor to Jeddeloh Bros. Sweed Mills, Inc., Gold Hill, Oreg.
Filed June 27, 1968, Ser. No. 740,676
Int. Cl. B32b *31/06, 31/12*
U.S. Cl. 156—299      9 Claims

ABSTRACT OF THE DISCLOSURE

Apparatus and method for laying up plywood panels. Included in the apparatus is a veneer conveyer for carrying a series of presized veneer sheets in one direction, and a core conveyer spaced above the veneer conveyer for carrying core pieces in the same direction. The core conveyer converges on the veneer conveyer to place core pieces on the veneer sheets at a placement station. Supply means upstream from the placement station deposits a charge of multiple core pieces on the core conveyer, with the grain of the core pieces extending transversely of the core conveyer. Glue sprayers are supported above the veneer conveyer, with one upstream of the placement station and another downstream of the placement station. And these apply glue to the upper faces of the veneer sheets and the upper faces of the core pieces, respectively.

---

This invention relates to a method and apparatus for laying up plywood panels.

The usual procedure for laying up plywood panels requires that a workman take core pieces coated with adhesive on opposite faces and lay these core pieces side by side on a presized veneer sheet such as a face, back or center ply. The procedure is relatively time consuming and labor requirements are high. More recently mechanical systems have been proposed to expedite the assembly of plywood panels, but in those known to date, the system proposed for handling the core pieces has introduced the most problems. This is because core pieces are of irregular size and it is difficult to get them suitably arranged on a presized veneer sheet such as a face or back without overlapping, excessive voids between adjacent pieces, without waste at the margins of the assembled panel, etc.

One object of this invention is to provide plywood lay-up apparatus which features a charge forming station where core pieces are laid up side by side with no attempt to get them in their final edge-abutted relationship. With the charge-formed the charge is conveyed onto a core piece conveyer with the core pieces in the charge then extending transversely of the conveyer. The core pieces are then crowded together and then transported transversely of their grain to an assembly station where assembly of the panel takes place.

Another object is the provision of a novel method of laying up the plywood panels which features the forming of charges of core pieces to one side of a conveyer line with these then transported to the conveyer line for ultimate crowding together and assembling of the plywood panel.

A further object of the invention is to provide novel method and apparatus for laying up plywood panels with a unique system for applying the adhesive required to hold the panel together. Thus, and according to a preferred embodiment of the invention, rather than apply adhesive to opposite faces of the core pieces and then position these in proper position, adhesive is applied to the presized veneer sheet upon which the core pieces are to be deposited and the core pieces have adhesive applied to those faces in the pieces which are exposed after the pieces are positioned on the presized veneer sheets.

These and other objects and advantages will become more apparent as the following description is read in conjunction with the drawings, wherein:

FIG. 1 is a top-plan view, somewhat simplified, of plywood panel lay-up apparatus constructed in accordance with an embodiment of the invention, illustrating an elongated core conveyer and core supply means positioned laterally of the core conveyer;

FIG. 2 is a side elevation view, taken generally along the line 2—2 in FIG. 1; and FIG. 3 is a cross-sectional view of the core supply means, taken generally along the line 3—3 in FIG. 1, and somewhat enlarged.

Referring now to the drawings, and first more specifically to FIGS. 1 and 2, 10 indicates the plywood panel lay-up apparatus generally. The apparatus includes, as is best seen in FIG. 2, a power-driven, elongated veneer conveyer including belts 12, 13, adapted to carry a series of presized veneer sheets 14 along a path to the right in FIG. 2. Such presized veneer sheets may be faces, backs, or centers, and are cut to have roughly the dimensions of the final plywood panel. The sheets are positioned with their grain extending in the direction of travel of the veneer conveyer.

A power-driven core conveyer, indicated generally at 18, is shown spaced above the veneer conveyer. The core conveyer may include a pair of endless belts 20 trained over a series of pulleys such as those shown as 22, 24, 26, 28, as seen in FIG. 2. The upper reaches of belts 20 adjacent the left end of the figure are substantially horizontal and parallel veneer conveyer 12. The upper reaches of the belts progressing to the right from pulley 24, slope downwardly toward and thus converge on veneer conveyer 12. The belts are moved so that their upper reaches move to the right in FIG. 2, or in the same direction as conveyer 12.

Core crowding means, indicated generally at 36, is provided for crowding core pieces, such as pieces 32, into edge-butted relationship while they are carried on the core conveyer. The core crowding means comprises a pair of rubber surfaced rollers 38, adapted to engage the upper faces of core pieces, which are mounted on a shaft 40 and driven by a motor 42. Underneath and opposite rollers 38 are a pair of freely rotatable back up wheels such as the one illustrated at 44 in FIG. 2. Rollers 38 and wheels 44 press against opposite faces of core pieces carried on the core conveyer, and with motor 42 turning rollers 38 in a counter-clockwise direction (as viewed in FIG. 2) and at a speed which is slightly faster than the speed of conveyer belts 20, the core pieces will be crowded into edge-butted relationship in a region downstream from the crowding means. A pair of elongated hold down bars 48 parallel and closely overlie the upper reaches of belts 20 in a region downstream from the core crowding means, to prevent adjacent core pieces from riding up and over each other.

As is best seen in FIG. 2, conveyer belts 20 double back on passing over pulleys 26. A pair of elongated support bars 50 paralleling conveyer belts 20 serve as extensions of the belts and function to slidably support the core pieces until immediately before they drop onto the veneer conveyer. At the region indicated at 51, referred to herein as a placement station, the core pieces leave bars 50 to become deposited on and supported by the upper faces of the veneer sheets traveling on conveyer 12.

Positioned downstream from the hold down bars and support bars, is a clipper unit 54. The clipper may be a conventional one, and includes a knife 56, shown in dotted outline, which extends transversely across the veneer conveyer above the conveyer. The knife blade is connected to operating mechanism (not shown) which is adapted when actuated to reciprocate the blade vertically, to cut material located between the blade and an underlying anvil member 57.

An assembly station is indicated generally in FIGS. 1 and 2 in dot-dash outline at 60. At the assembly station, further lay up of a plywood panel takes place, through the depositing on the core pieces of another presized veneer sheet which forms another ply in the panel.

A first glue sprayer 64, also referred to as glue-applying means, is supported between the core conveyer and the veneer conveyer, in a region upstream from the placement station. As is best seen in FIG. 1, sprayer 64 comprises an elongated manifold, which has multiple orifices spaced apart along its length, through which glue or adhesive is sprayed onto the upper surfaces of veneer sheets 14. The sprayed glue on traveling toward the veneer follows the path indicated by arrows 65 in FIG. 2.

A second glue sprayer 66, also referred to as glue-applying means, is positioned above veneer conveyer 12 in a region downstream from placement station 51 and upstream from clipper 54. Sprayer 66 may be similar to sprayer 64, and is operable to spray glue onto the upper surfaces of core pieces 32.

Referring now to FIGS. 1 and 3, a core supply means is indicated generally at 70. The core supply means comprises a housing 72, having mounted within it an elongated, horizontal, power-driven roller 74, also referred to herein as a rest. Roller 74, which is smooth surfaced and may be made of steel, has substantially the same length as housing 72, and is positioned within the housing with its axis paralleling belts 12 and 20. The roller is driven by a motor (not shown) to rotate in the direction of arrow 75 in FIG. 3.

Mounted within housing 72 generally above roller 74 is a roller mechanism 77 comprising a plurality of axially aligned rubber tired whels 78. These are suitably journaled on supports, such as support 80, which are joined to and project downwardly from an elongated support beam 84 of T-shaped cross-section. End plates, such as end plate 86, are joined to the ends of beam 84, and journals, such as the journals shown at 90, support the end plates and the assembly between the end plates for swinging movement about a substantially horizontal axis which generally parallels the axis of roller 74.

To the right of roller mechanism 77 in FIG. 3, and substantially paralleling the roller mechanism is an elongated fence 92. The fence, which is shown in cross-section in FIG. 3, has its ends suitably fixed to end plates 86. Roller mechanism 77 and the fence are swung about the axis provided by journals 90 through operation of a ram 94. Ram 94 is connected at one of its ends to housing 72, and at its other end to one of the mounting plates 86. With the ram retracted, roller mechanism 77 and fence 92 are positioned as illustrated in FIG. 3. Extension of the ram rotates mounting plate 86 in a counter-clockwise direction in FIG. 3, to move roller mechanism 77 downwardly and into a position directly above roller 74. Fence 92 at the same time swings upwardly and into the position illustrated in dot-dashed outline at 92A.

Mounted in front of the core supply means is a series of elongated, laterally spaced-apart, freely rotatable jump rollers 96. The jump rollers may be mounted on an elevatable frame (not shown) which may be elevated to move the jump rollers from the lowered position shown in solid outline in FIG. 3 (where the tops of the rollers are below belts 20), to the raised position shown in dot-dash outline (where the rollers protrude slightly above the belts 20). With normal operation of the apparatus, the jump rollers are raised with roller mechanism 77 swung downwardly, and in their raised position, the rollers function to guide core pieces forwardly over the belts 20. With roller mechanism 77 swung to its raised position and fence 92 lowered, rollers 96 are normally lowered to permit any material formerly supported on the rollers to be advanced by belt 20.

On the opposite side of the core conveyer from the core supply means, a fence bar 98 is provided which generally parallels the belts of the core conveyer. As best seen in FIG. 3 where the bar is illustrated in cross-section, the bar extends a substantial distance above the plane of belts 20, whereby it may serve as a stop for core pieces advanced thereagainst from the core supply means.

Referring again to FIG. 1, a stack of core pieces is shown at 102 which is disposed directly adjacent the feed side of core supply means 70. The stack comprises stacked layers of core pieces with each layer comprising multiple core pieces of random width, as represented by the core pieces shown at 105. Ordinarily, the stack of core pieces is supported on a suitable elevator to permit raising of the stack as the height of the stack is decreased through removal of core pieces. The core pieces are arranged in the stack with their grain extending normal to the axes of roll 74 and roller mechanism 77.

Describing now the operation of the apparatus, and the method of the invention, presized veneer sheets such as those shown at 14, are placed on the veneer conveyer with their grain substantially paralleling the conveyer and with a small space provided between adajcent sheets. As the veneer sheets are moved along by operation of conveyer 12, they pass under glue sprayer 64 where they have an adhesive coating applied to their upper faces.

According to this invention, core pieces are deposited on the core conveyer by first forming a charge of multiple sheets in a region located to one side of the core conveyer, and then advancing all of the sheets in the charge simultaneously to place the sheets on the core conveyer. To form a charge of sheets, roller mechanism 77 in the core supply means is raised and fence 92 lowered by contraction of ram 94. Core pieces from the top layer in stack 102 are then moved forwardly from the stack to shift the forward ends beneath roller mechanism 77 and against fence 92. This may be done either manually or by mechanical means. No attempt is made to closely abut the side edges of the pieces.

With the core conveyer clear of core pieces in the region located directly in front of the core supply means, and after a charge of pieces has been prepared, jump rollers 96 are raised and the roller mechanism 77 is swung down to cause the core pieces to be pinched firmly between the roller mechanism and under-lying roller 74. With roller 74 being constantly rotated, this results in the core pieces moving forwardly with the pieces traveling over belts 20 and finally having their motion stopped by striking fence 98. With subsequent lowering of the jump rollers, the core pieces will then be moved along the core conveyer with the core pieces now being moved in a direction extending generally tranversely of their grain. With the charge of sheets clearing the core piece supply means, roller mechanism 77 is raised and fence 92 lowered to permit a subsequent charge of pieces to be prepared. The time that it takes core pieces to clear the region in front of the core supply means is utilized in preparing the new charge of core pieces.

Core pieces, on moving down the core conveyor, initially will have one set of ends aligned by striking fence 98. On passing into core crowding means 36, the core pieces are crowded together with adjacent edges of the pieces abutting. On moving under glue sprayer 66, a coating of adhesive is applied to top faces of these abutted sheets. On traveling beyond bars 50, an assembly is formed comprising the presized veneer sheets on the veneer conveyer and an overlying layer of edge-butted core pieces deposited thereon by the core conveyer.

On moving through clipper 54, the assembly is cut into segments through operation of the clipper. Clipper operation is controlled so that the blade 56 is reciprocated to produce a cut in those regions of the assembly passing through the clipper where the presized sheets in the assembly are spaced from each other.

The sections produced, therefore, comprise a presized veneer sheet and an overlying layer of core pieces with such edgebutted and resting on the presized veneer sheet with an adhesive deposit existing between the core pieces and the presized veneer sheet. A glue deposit is also formed over the top of the core pieces. To complete the panel, in the final assembly station, and assuming that the presized veneer sheet under the core pieces is a back, a face veneer sheet can be placed over the core pieces to form a three-ply panel. Of course, other variations are possible. For instance, if the core pieces are lying on a face veneer, then it is the back which is placed over the core pieces to complete a three-ply panel. In producing a five-ply panel, the presized sheet which is placed over the core pieces may be a center veneer sheet. As an alternative, the material deposited over the core pieces may comprise a center which itself has an overlying layer of core pieces applied thereto. In other words, the product of the apparatus and system shown can be consolidated with a product produced by a similar assembly line in the production of panels having five or even a greater number of plies.

While a particular embodiment of the invention has been described, it should be obvious that modifications and variations are possible without departing therefrom. It is desired to cover all such organizations of the invention as would be apparent to one skilled in the art and that come within the scope of the appended claims.

It is claimed and desired to secure by Letters Patent:

1. A method for continuously laying up plywood panels where each panel includes plural abutting core pieces joined to one face of a veneer sheet comprising moving a series of presized veneer sheets continuously along a first path with such sheets extending in the plane of and following one another along such path with the grain in each sheet extending along said path, applying a veneer sheet glue coating to one set of faces of such sheets in the series with such sheets moving along said path, providing a series of core pieces in edge-butted relationship on a second path by forming charges of core pieces at a forming station disposed laterally of said second path, with each of such charges comprising multiple core pieces disposed in a row with the core pieces side-by-side in said row and the grain of the core pieces extending transversely of the row, and moving the charges laterally of said forming station successively onto said second path with one charge following another on said path and with the grain of the core pieces in the various charges extending transversely of the grain in the veneer sheets, moving such series of core pieces along said second path with said second path converging on the first path at a point in said first path downstream from where the glue coating is applied to the veneer sheets, with such movement positioning the core pieces against the veneer sheets with one set of faces of the core pieces against the glue-bearing faces of the veneer sheets, applying a core piece glue coating to the opposite set of faces of the core pieces, moving the presized veneer sheets with core pieces placed against them to an assembly station, and at said assembly station placing additional veneer sheets against said opposite set of faces of the core pieces.

2. The method of claim 1, wherein the charges of core pieces are placed on the second path with the pieces in the charges spaced apart, and wherein such core pieces are crowded into edgebutted relationship while moving along such second path.

3. The method of claim 2, wherein the veneer sheet glue coating is sprayed on one set of faces of the veneer sheets during their movement along said first path, and the core piece glue coating is sprayed on the opposite set of faces of the core pieces after their being crowded together.

4. The method of claim 1, wherein the core piece glue coating is applied to the opposite set of faces of the core pieces after placement of the core pieces against the veneer sheets.

5. Apparatus for continuously laying up plywood panels where each panel includes plural abutting core pieces joined to one face of a veneer sheet comprising a power-driven elongated veneer conveyer for carrying a series of presized veneer sheets continuously and successively in one direction therealong with the grain in each sheet extending in said one direction, an elevated power-driven core conveyer spaced above said veneer conveyer for carrying multiple core pieces continuously and successively in said one direction toward the downstream end of the veneer conveyer with the grain in each core sheet extending transversely of said one direction, said core conveyer at a placement station converging on the veneer conveyer where it deposits core pieces on the upper faces of veneer sheets carried on the veneer conveyer, core supply means disposed laterally of said core conveyer and upstream from said placement station operable to deposit successive charges of multiple elongated side-by-side core pieces on said core conveyer, with the grain of such core pieces extending transversely of the grain of said veneer sheets, and with one charge following another on the core conveyer, core crowding means intermediate said core supply means and said placement station for crowding core pieces into edge-butted relationship while carried on said core conveyer, first glue applying means positioned upstream from said placement station for applying a glue coating to the upper faces of the veneer sheets on the veneer conveyer, and second glue applying means for applying a glue coating to the upper faces of the core pieces.

6. The apparatus of claim 5, wherein said first glue applying means comprises a glue sprayer disposed above said veneer conveyer upstream from said placement station.

7. The apparatus of claim 5, wherein said second glue applying means comprises a glue sprayer positioned downstream from said placement station and above said veneer conveyer.

8. The apparatus of claim 5, wherein said crowding means comprises a roller rotatable about an axis spaced vertically from and extending transversely of said core conveyer, said roller being positioned to engage core pieces carried by said core conveyer, and drive means connected to said roller operable to drive said roller at a speed which is greater than the speed at which the core conveyer carries said core pieces.

9. The apparatus of claim 5, wherein said core supply means comprises a first elongated roller means generally paralleling the core conveyer for resting thereupon ends of core pieces during the laying up of a charge of core pieces, and an opposed elongated roller means movable to clamp the ends of the charge of core pieces against the first elongated roller means, with at least one of said roller means being power-driven.

References Cited

UNITED STATES PATENTS

| | | | |
|---|---|---|---|
| 2,744,562 | 5/1956 | LaRocca et al. | 156—556X |
| 2,890,675 | 6/1959 | Cheever | 156—562X |
| 3,084,090 | 4/1963 | Rambo et al. | 156—299 |
| 3,367,823 | 2/1968 | Clausen et al. | 156—559X |

BENJAMIN A. BORCHELT, Primary Examiner

J. M. HANLEY, Assistant Examiner

U.S. Cl. X.R.

156—560, 562